United States Patent [19]

Turchan

[11] Patent Number: 4,934,040
[45] Date of Patent: Jun. 19, 1990

[54] SPINDLE DRIVER FOR MACHINE TOOLS

[76] Inventor: Manuel C. Turchan, 12825 Ford Rd., Dearborn, Mich. 48126

[21] Appl. No.: 884,000

[22] Filed: Jul. 10, 1986

[51] Int. Cl.$^5$ ............................................. B23G 1/34
[52] U.S. Cl. ...................................... 29/566; 10/140; ·408/26; 409/71; 409/74; 409/232
[58] Field of Search .................. 409/66, 67, 74, 78, 409/80, 199, 200, 232, 65, 68, 69, 70, 71; 408/3, 23, 219, 220, 26; 407/53, 54, 59; 29/566; 10/140; 279/6

[56] References Cited

U.S. PATENT DOCUMENTS

| | | | |
|---|---|---|---|
| 2,286,477 | 6/1942 | Falls | 409/74 X |
| 2,451,497 | 10/1948 | Kratchman | 409/74 |
| 2,454,087 | 11/1948 | Ransome | 409/77 |
| 2,526,762 | 10/1950 | Miller | 409/77 X |
| 2,742,796 | 4/1953 | Zorich | 74/384 |
| 2,796,767 | 6/1957 | Carpenter | 408/137 |
| 2,875,629 | 3/1959 | Poorman . | |
| 2,929,300 | 7/1956 | Zwick . | |
| 3,105,413 | 10/1963 | Lanzenberger | 408/21 X |
| 3,259,958 | 7/1966 | Lemelson | 29/26 |
| 3,512,433 | 11/1967 | Juhasz et al. | 408/137 |
| 3,526,167 | 9/1970 | Escobedo | 409/200 X |
| 3,583,822 | 6/1971 | Alexander et al. | 408/11 |
| 3,803,981 | 4/1974 | Allgeyer | 409/193 |
| 3,859,001 | 1/1975 | Hoddinott et al. | 408/3 |

FOREIGN PATENT DOCUMENTS 586583 4/1977 Switzerland ..................... 408/137

OTHER PUBLICATIONS

Light-Weight Roll and Z-Axis Unit for Horizontal-Type Robot Arms, Robomatix, Limited, publication date unknown.

Primary Examiner—Z. R. Bilinsky
Attorney, Agent, or Firm—Remy J. VanOphem

[57] ABSTRACT

A spindle driver for a machine tool is disclosed which is adapted to move the spindle and a tool driven thereby in a helical path with variable pitch and with an orbital radius which may be varied. A quill is mounted on a support member and driven by a variable pitch drive mechanism in the form of a differential lead screw to provide a selectable ratio of axial motion to rotative motion of the quill. A spindle carrier is rotatably mounted on the quill for rotation about an eccentric axis offset from the quill axis. A spindle motor and a spindle driven thereby is mounted on a carrier with the spindle axis offset from the eccentric rotation axis. The orbital radius for the spindle is adjustable by rotation of the spindle carrier about the eccentric rotation axis to adjust the offset of the spindle axis.

17 Claims, 5 Drawing Sheets

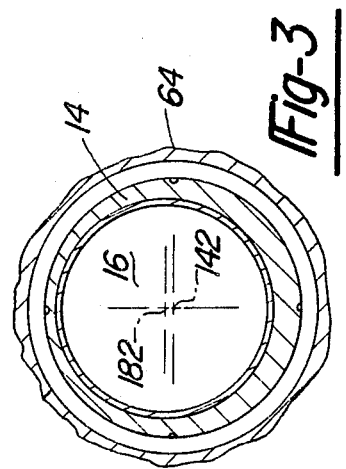
Fig-1
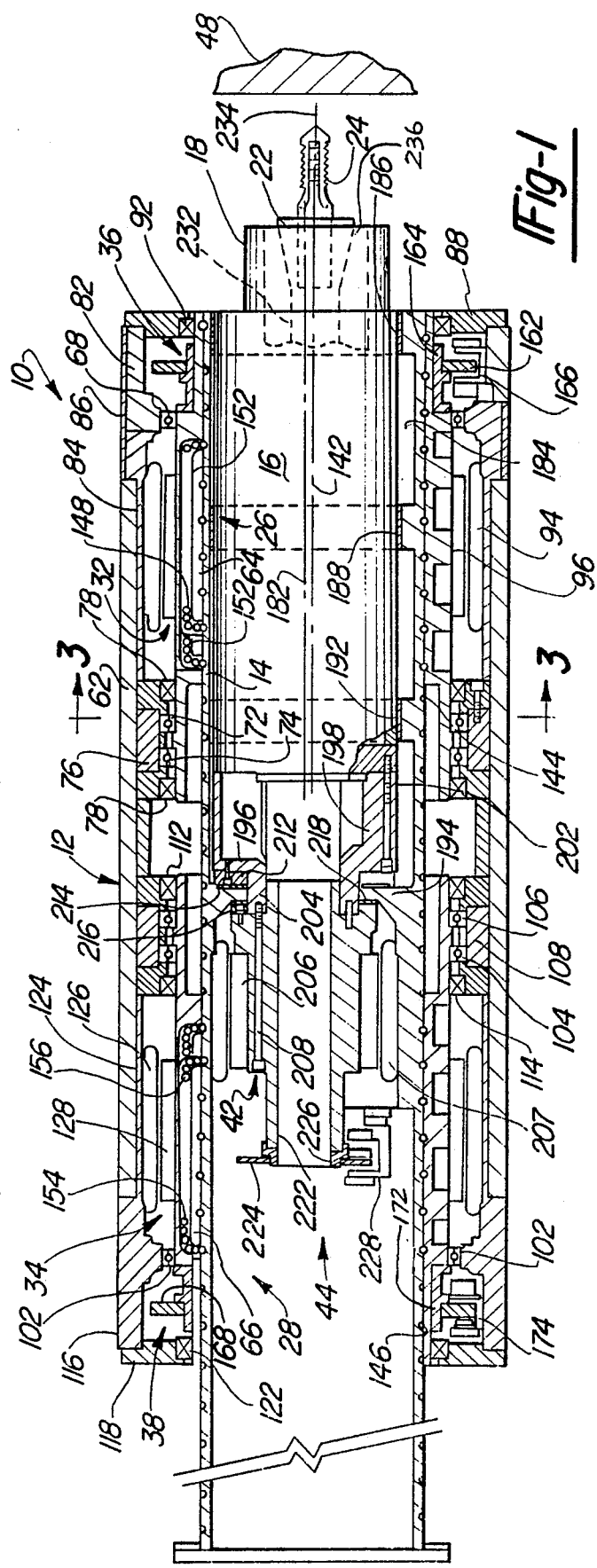
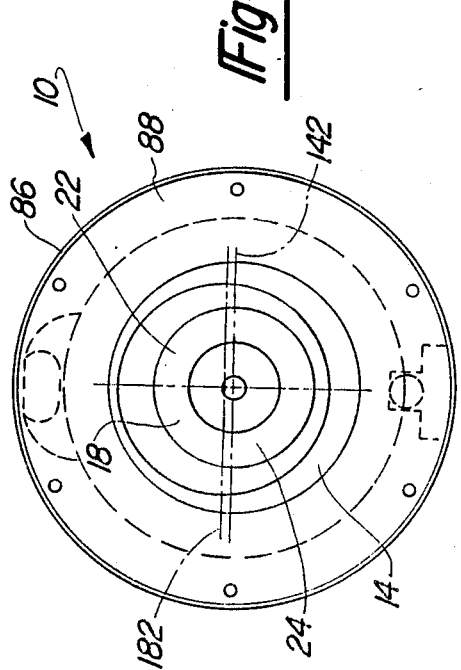
Fig-2
Fig-3

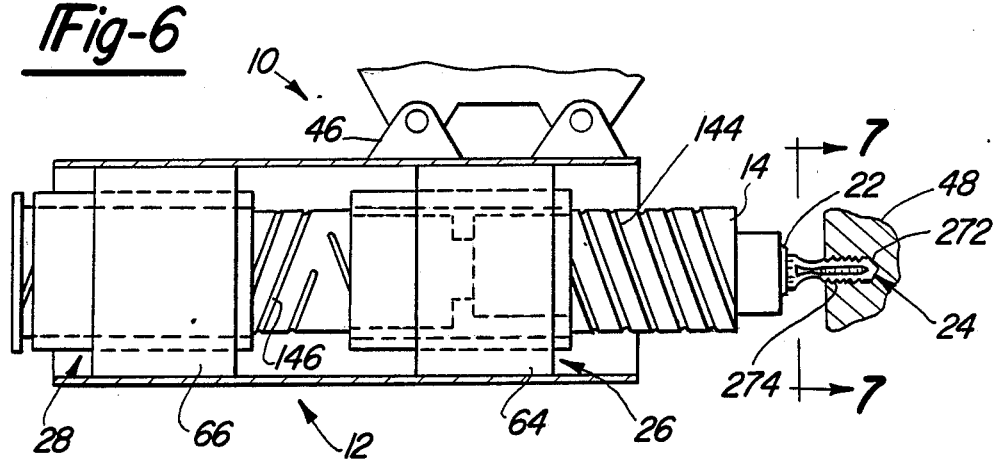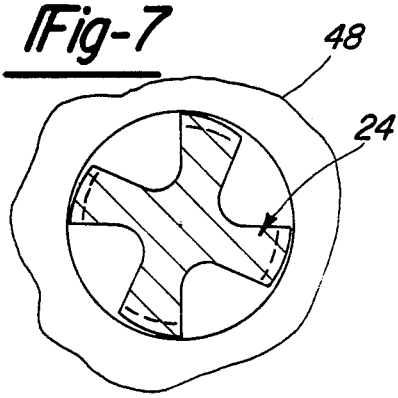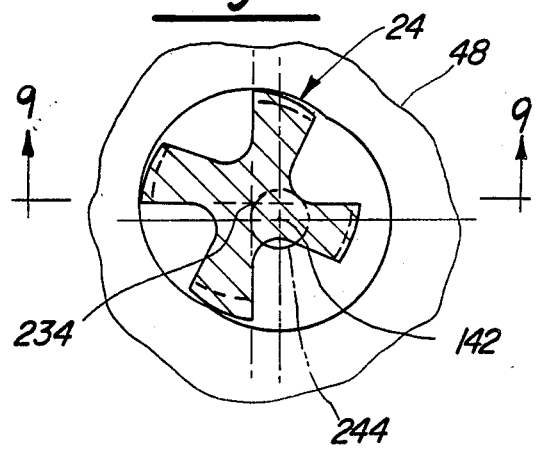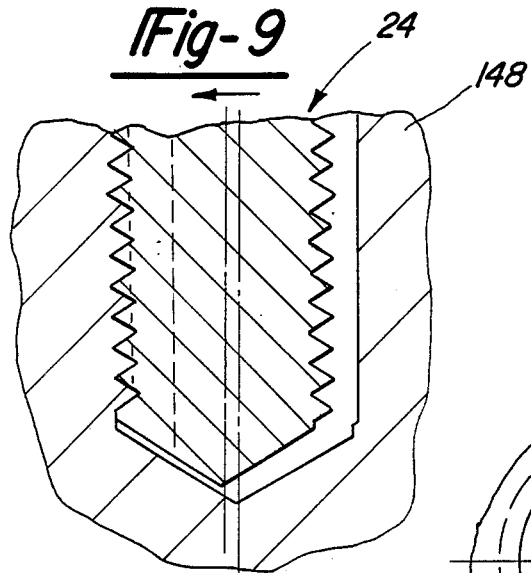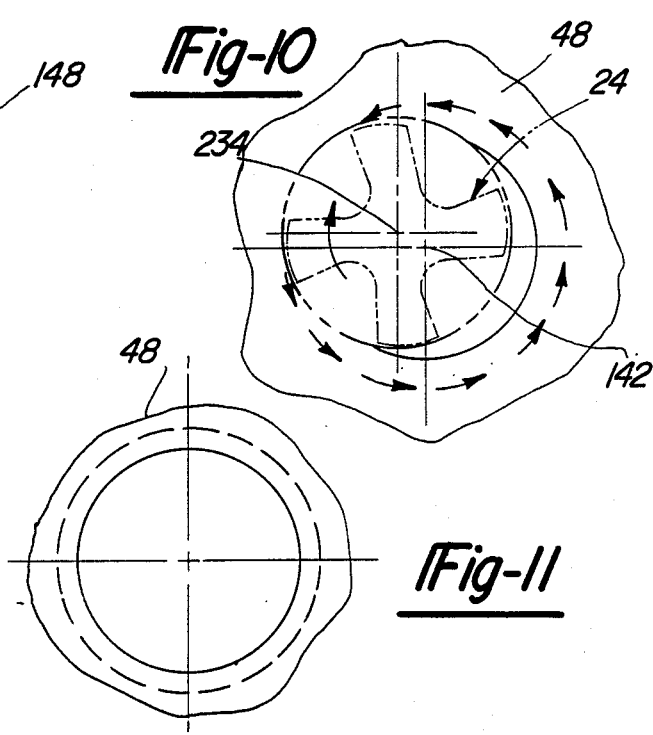

SPINDLE DRIVER FOR MACHINE TOOLS

BACKGROUND OF THE INVENTION

1. Field of the Invention

This invention relates to machine tools; more particularly, it relates to a mechanism for driving the axis of a rotative spindle along a programmed path.

2. Description of the Prior Art

There are many applications in the machining of metals and other materials wherein it is desirable to move a tool along a programmed path other than or in addition to rotation about its own axis and rectilinear displacement along that axis or normal thereto. In particular, there are applications in which it is desired to rotate a cutting tool about its own axis while it is fed longitudinally of its axis, in the manner of a drill or end mill as in a simple drilling operation and, to compound the tool motion by moving the tool axis in an orbital path during tool rotation and axial feed, as in the case of milling threads in a drilled hole. Such a tool spindle driver is especially useful in high speed machining; for example, in making a hole on the inward feed of the tool and milling threads therein on the continued inward feed or the outward feed of the tool. A special tool adapted for combined hole making and thread making with a single spindle is disclosed and claimed in copending application Ser. No. 840,443 entitled "COMBINED HOLE MAKING AND THREADING TOOL" filed Mar. 17, 1986 by Manuel C. Turchan. In general, there are many applications in the use of machine tools for a spindle driver which can impart helical motion to a tool either with or without rotation of the tool about the tool axis. For general applications of this kind, it is desired to provide a helical motion of variable pitch and variable diameter.

The prior art includes apparatus for milling internal threads in a bore in a workpiece. Apparatus of this kind is described in Miller et al 2,526,762 granted Oct. 24, 1950. The miller et al patent describes a machine in which a tubular workpiece is mounted for revolution in a fixed longitudinal position with machine elements carrying threading hobs positioned eccentrically of the workpiece in cutting engagement with the internal periphery thereof and mounted for longitudinal movement relative to the workpiece as the revolution of the workpiece progresses. The Miller et al patent also describes a machine in which the threading hob is longitudinally fixed and the workpiece is moved longitudinally during revolving motion thereof for cutting the threads.

The Escobedo Pat. No. 3,526,167 granted Sept. 1, 1970 describes a milling head for driving a rotary cutting tool in a predetermined path such as a spiral path. A fixed paper upper housing is mounted on the quill of a milling machine and a manually rotatable lower housing is connected therewith by a pair of telescopic tubes. Within the inner telescopic tube, an internally threaded guide cylinder is mounted on the fixed upper housing and an externally threaded guide cylinder engages the first guide cylinder and is attached to the rotatable lower housing. The spindle of the milling machine is coupled with the rotary drive shaft which extends coaxially of the guide members and carries a drive gear in the lower housing. A driven gear is mounted on a driven spindle having a tool socket adapted to receive a shank of a cutting tool. An intermediate gear engages both the drive and driven gear and transmits rotary motion therebetween. A transverse guideway in the lower housing contains a slide block which is pivoted on a stub shaft carrying the intermediate gear. The slide block can be pivoted so that the driven gear is aligned or selectively misaligned with the driving gear. This positioning of the slide block allows the driven spindle to be positioned coaxially of the driving spindle or to be adjustably positioned eccentrically of the driving spindle.

The Lanzenberger Pat. No. 3,105,413 granted Oct. 1, 1963 discloses a machine tool for milling or grinding a cylindrical or conical bore. In this machine tool, a main spindle carries a tool holder which is rotationally driven by the main spindle about the main spindle axis. A grinding tool carried by the tool holder has its own driving means such as a pneumatic turbine. The rotational axis of the grinding tool is shifted relative to the main spindle axis by means of a cam disposed within the main spindle. The main spindle is disposed for rotation within a spindle support which carries the tool holder at the lower end. The tool holder is rotatably driven by the main spindle and it is moved axially by a spindle support sleeve which is driven by an external driving member. A crank lever is moved with respect to the spindle support sleeve and imparts axial movement to an inner spindle which engages the cam for adjusting the offset of the axis of the spindle of the grinding tool from the axis of the main spindle.

The Hoddinott et al Pat. No. 3,859,001 granted Jan. 7, 1975 discloses a mechanism for driving a quill in the tool head of a machine tool. In this apparatus, the quill carries a rotatable spindle which drives a working tool. The quill is held against rotation and is advanced and retracted relative to the workpiece by a ball screw.

The Kratchman Pat. No. 2,451,497 granted Oct. 19, 1948 discloses a thread miller adapted for milling internal threads. An inner housing has a cylindrical upper portion which is coupled with a power shaft and has a lower portion with an eccentric cylindrical internal shaftway therein. An eccentric bushing has a driven shaft journalled therein and the bushing is rotatable within the eccentric shaftway of the inner housing. A coupling shuttle connects the drive shaft to the driven shaft and a milling cutter is mounted on the driven shaft. Means are connected to the eccentric bushing for rotating it and thus varying the eccentricity of the milling cutter. The inner housing is provided with external threads which coact with the threads of a rotatable, axially fixed nut in the manner of a lead screw for spirally moving the inner housing to cause the milling cutter to mill a thread in a drilled hole.

The Zorich Pat. No. 2,742,796 granted Apr. 24, 1956 discloses an adjustable drill holder for use in drilling eccentric holes. A driving shaft is journalled eccentrically in a holder which is secured in a bore in the turret of a machine tool. A driving shaft is connected through gearing to a spindle which carries a collet for a drill. The spindle is journalled in a rotatable head and is eccentric from the axis of the holder. By adjusting the holder about its axis and by adjusting the head about its axis, the offset or eccentricity of the drill can be varied from zero up to a predetermined distance from the axis of the holder.

It is known to use lead screws for advancing and retracting a spindle of a machine tool, as described in Kratchman Pat. No. 2,451,497 cited above. It is also known in the prior art to utilize a differential lead screw for positioning of robot arms and the like. A differential lead screw for this purpose is available from Robomatix, Limited of Israel and is illustrated in an undated leaflet entitled "LIGHTWEIGHT ROLL AND Z AXIS UNIT FOR HORIZONTAL TYPE ROBOT ARMS".

A general object of this invention is to provide an improved spindle driver for imparting helical motion to a rotating tool with controllable pitch in a mechanism which overcomes certain disadvantages of the prior art.

SUMMARY OF THE INVENTION

In accordance with this invention, a spindle driver is provided which is adapted to move a rotative spindle and a tool driven thereby in a helical path with any desired pitch, constant or variable, and with a selected orbital radius variable from zero to a selected larger value. Further, the spindle drive is a simple mechanism adapted for compact and lightweight design of relatively low inertia. It is especially adapted for very high speed machining operations and is provided with an integral high speed spindle motor which along with the spindle is moved in the helical path. The setting of the variable radius of the path is accomplished by angular adjustment of an eccentric spindle carrier rotatably mounted on a quill for rotation about an eccentric rotation axis. The spindle is mounted on the carrier and the spindle rotation axis is offset from the eccentric rotation axis by the same distance that the eccentric rotation axis is offset from the quill rotation axis whereby the offset of the spindle rotation axis from the quill rotation axis may be varied from zero to a larger value. The variation of the pitch of the helical path is accomplished by a variable pitch drive means for the quill which produces any desired ratio of axial displacement and angular displacement.

Further, in accordance with this invention, the quill has a recess therein and the spindle carrier is disposed in the recess for rotation about the eccentric rotation axis. The quill is cylindrical and carried by a support member having a cylindrical bore therein with the quill being rotatable and reciprocable in the bore. Further, the drive means includes a variable pitch drive means such as a differential lead screw.

Further, in accordance with this invention, a spindle driver is provided which includes a quill mounted on a support member, a spindle carrier mounted on the quill with a spindle mounted thereon for rotation about a spindle rotation axis and adapted to support a tool for coaction with the workpiece. Means are provided for actuating the spindle carrier to produce translational movement between the spindle rotation axis and the quill rotation axis. A variable pitch drive means is provided for simultaneously displacing the quill angularly about the quill rotation axis and axially along the quill rotation axis in a predetermined ratio of angular and axial displacement.

Further, in accordance with this invention, the variable pitch drive means includes a differential lead screw having a pair of nuts and a threaded shaft. The nuts are rotatably mounted and axially fixed relative to the support member and the threaded shaft threadedly engages the nuts and is coupled with the quill for movement thereof. Separate reversible rotational drive motors are adapted for rotating the nuts independently of each other whereby the quill may be selectively displaced rotatively and axially in any desired ratio, either concurrently or at different times. Further, the spindle motor is mounted on the spindle carrier for rotating the spindle. Further, the spindle carrier also includes a member mounted on the quill for rotation about an eccentric rotation axis offset from the quill rotation axis.

Further, in accordance with this invention, a spindle driver is provided which has a quill carried by a support member and includes a hollow shaft mounted on the support member for rotation about a quill rotation axis and for motion along the quill rotation axis. A spindle carrier having an eccentric member is rotatably mounted within the quill for rotation about an eccentric rotation axis which is offset from the quill rotation axis. A spindle motor is mounted on the eccentric member and a spindle is coupled with the spindle motor for rotation about a spindle rotation axis which is offset from the eccentric rotation axis. Means are provided for rotating the eccentric member about the eccentric rotation axis for producing relative translational movement between the spindle rotation axis and the quill rotation axis. A variable pitch drive means is provided for simultaneously displacing the quill angularly about the quill rotation axis and axially along the quill rotation axis in a predetermined ratio of angular and axial displacement.

Further, according to the invention, the quill has an eccentric bore therein and the eccentric member is a cylindrical body rotatively mounted in the bore. Further, the spindle rotation axis and the quill rotation axis coincide when the eccentric member is rotated to a predetermined reference position. The eccentric member is provided with an axially extending cavity and at least part of the spindle motor is disposed within the cavity. The means for rotating the eccentric member is a servo coupled therewith and mounted in the hollow shaft. Further, the support member is disposed circumferentially around the quill and the variable pitch drive means is disposed between the support member and the quill.

A complete understanding of this invention may be obtained from the detailed description that follows taken with the accompanying drawings.

BRIEF DESCRIPTION OF THE DRAWINGS

FIG. 1 is a sectional view in elevation of the spindle driver of this invention;

FIG. 2 is an end view of the spindle driver looking at the forward end thereof;

FIG. 3 is a view taken on line 3—3 of FIG. 1;

FIG. 6 is a view in elevation with parts broken away of the spindle driver;

FIG. 7 is a view taken on line 7—7 of FIG. 6 showing a tool in a hole making operation;

FIG. 8 is a view of the tool in a thread milling operation;

FIG. 9 is a view taken on lines 9—9 of FIG. 8;

FIG. 10 is a diagrammatic showing of the path of the tool in thread cutting;

FIG. 11 is a view of the threaded hole; and

DETAILED DESCRIPTION OF THE PREFERRED EMBODIMENT

Figure 4:
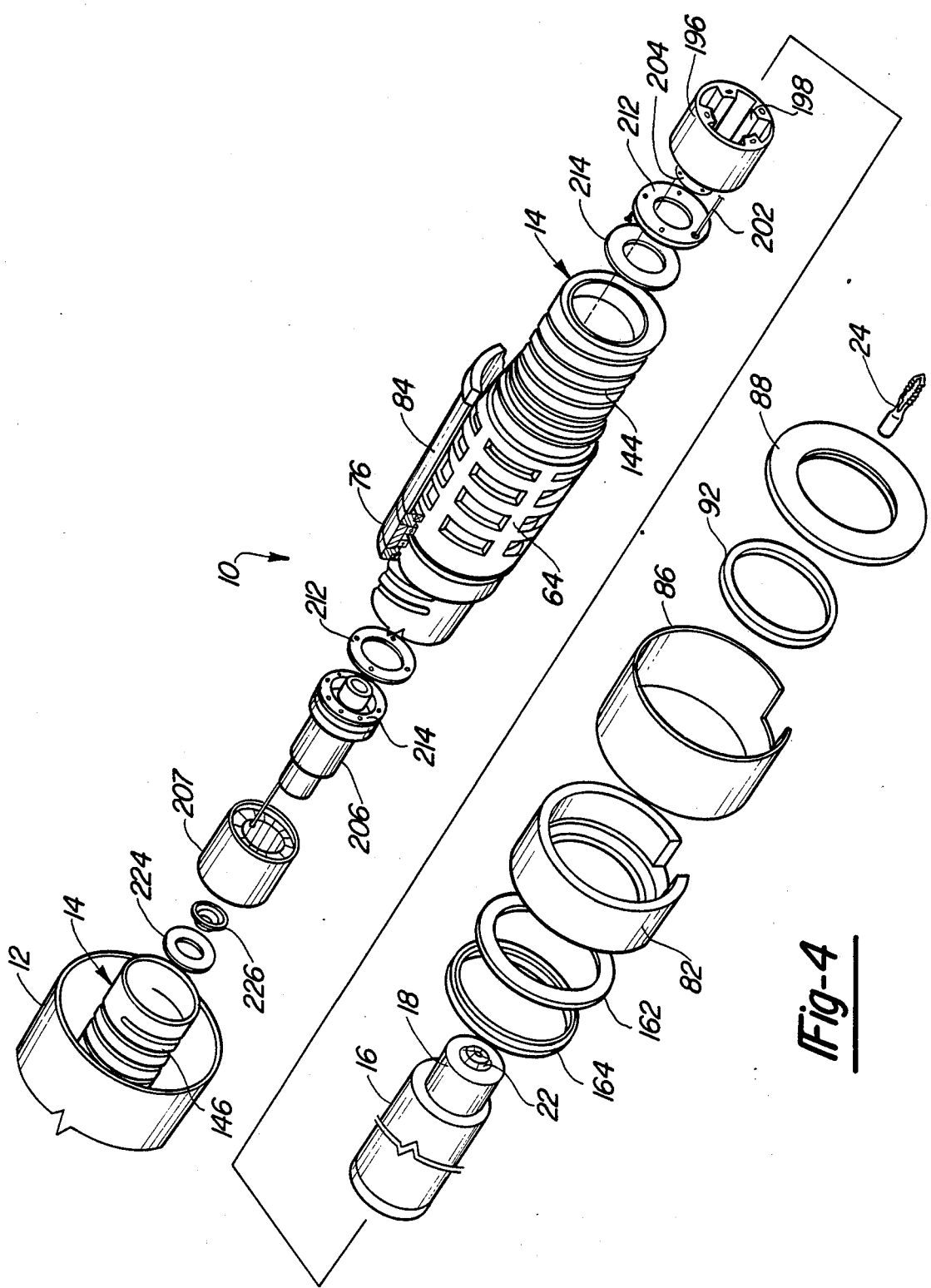
FIG. 4 is an exploded view of the spindle driver.

Referring now to the drawings, there is shown an illustrative embodiment of the invention in a spindle driver for use with a machine tool which positions the spindle driver relative to a workpiece. The spindle driver is described with reference to an illustrative application, namely that of hole drilling and thread milling using a single cutting tool in the spindle driver in sequential operations. It will be appreciated, as the description proceeds, that the invention may be realized in different embodiments and may be utilized in many different applications.

As shown in FIGS. 1 through 4, a spindle driver 10 includes, in general, a support member or frame 12 which carries a quill 14 which in turn carries a spindle carrier 16. The spindle carrier supports a spindle motor 18 which drives a spindle 22 adapted to support a tool 24. The quill 14 is axially and rotatably driven by a variable pitch drive mechanism in the form of a differential lead screw composed of a front lead screw 26 and a rear lead screw 28 which are actuated by servo motors 32 and 34, respectively. The servo motor 32 carries a shaft encoder 36 and the rear servo motor 34 carries a shaft encoder 38. The spindle carrier 16 is rotatably mounted in the quill 14 and is angularly positioned by a servo motor 42 which is coupled with a shaft encoder 44. The components of the spindle driver 10 referred to above will be described in detail in relation to each other subsequently.

The spindle driver, as shown in FIG. 6, is provided with support members or brackets 46 on the frame 12 for mounting on a machine tool (not shown). The spindle driver 10 is positioned by the machine tool relative to a workpiece 48 to be engaged by the tool 24.

The structure of the spindle driver 10 will now be described in detail with reference to FIGS. 1 through 4. The frame 12 includes a cylindrical casing 62 which supports nuts 64 and 66 of the front and rear lead screws 26 and 28, respectively. The lead screws, are of the recirculating ball type and each of the nuts includes ball return paths which will be described subsequently. For the purpose of rotatably mounting the front nut 64, a front bearing 68 and a pair of rear bearings 72 and 74 are provided. The rear bearings 72 and 74 are mounted in a retainer assembly 76 which is carried by the cylindrical casing 62. A pair of seals 78 are disposed at opposite ends of the retainer assembly 76. The front bearing 68 for the nut 64 is carried by a retainer ring 82. A stator housing 84 of the servo motor 32 is disposed within the casing 62 and extends between the retainer assembly 76 and the retainer ring 82. A support sleeve 86 surrounds the retainer ring 82 and the end of the stator housing 84. An end cap 88 with a seal 92 closes the forward end of the space between the front nut 64 and the retainer ring 82.

The front nut 64 is rotatively driven by the servo motor 32. The servo motor includes a stator winding 94 supported on the stator housing 84. A rotor 96 of the servo motor is carried directly on the body of the front nut 64. Thus, when the servo motor 32 is energized, the front nut is rotated with respect to the frame 12.

The rear nut 66 of the rear lead screw 28 is mounted on the frame 12 in a manner similar to that described with respect to the front nut 64. The rear nut 66 is of the same configuration as the front nut 64 and is supported by a rear bearing 102 and a pair of front bearings 104 and 106. The front bearings 104 and 106 are mounted in a retainer assembly 108 which is supported by the casing 62. The retainer assembly 108 supports a pair of seals 112 and 114. The rear bearing 102 is supported on a retainer ring 116 and an end plate 118 is disposed between the retainer ring 116 and the end of the rear nut 66. A seal 122 is carried by the end plate 118 and closes the rear end of the space between the rear nut 66 and the retainer ring 116. The stator housing 124 of the servo motor 34 is disposed within the casing 62 and extends between the retainer assembly 108 and the retainer ring 116.

The rear nut 66 is rotatively driven by the servo motor 34, which servo motor includes a stator winding 126 supported by the stator housing 124. The stator winding coacts with a rotor 128 which is mounted directly on the rear nut 66. When the servo motor 34 is energized, the rear nut 66 is rotatively driven with reference to the frame 12.

The variable pitch driven mechanism or differential lead screw for driving the quill 14 includes the front lead screw 26 and the rear lead screw 28. As will be described subsequently, the front and rear lead screws 26 and 28 are adapted to rotate the quill about its axis and to displace the quill along its axis. The quill 14 is a cylindrical hollow shaft and is mounted for rotation about a quill rotation axis 142 which is coaxial with the front and rear nuts 64 and 66. For this purpose, the quill 14 provided with a helical groove in the form of a right-hand thread 144 at the front end of the quill and a helical groove in the form of a left-hand thread 146 at the rear end of the quill. The front lead screw 26 includes the front nut 64 and the right-hand thread 144 in the quill and recirculating balls 148 which threadingly engage the front nut 64 with the right-hand thread 144. Preferably, the front nut 64 is provided with four different ball return paths 152, only two of which are shown in FIG. 1. The rear lead screw 28 is includes the rear nut 66, the left hand thread 146 and the quill 14 and recirculating balls 154. Preferably, the rear nut 66 is provided with four ball return paths 156, only two of which are shown. As will be described subsequently, the rotative motion of the quill 14 and its motion along the quill rotation axis 142 is controlled by the relative rotation of the respective servo motors 32 and 34 which rotate the front and rear nuts 64 and 66.

The shaft encoder 36 is adapted to provide an electrical signal corresponding to the instantaneous angular position of the front nut 64. It includes a code disk 162 which is mounted for rotation on the front end of the front nut 64 through an intermediary mounting sleeve 164. The encoder 36, suitably of the optical type, also includes a code reader 166 which is fixedly mounted on the retainer ring 82. Similarly, the shaft encoder 38 is adapted to develop an electrical signal corresponding to the instantaneous angular position of the rear nut 66. It has an optical code disk 168 which is mounted for rotation on the rear nut 66 through the intermediary mounting sleeve 172. The encoder 38 also has a code reader 174 which is fixedly mounted on the retainer ring 116.

The quill 14 is adapted to support the spindle carrier 16 for rotation about an eccentric rotation axis 182 which is transaxially offset from the quill rotation axis 142. The quill 14 defines an axially extending recess 184 which is open at the front end and adapted to receive the spindle carrier 16. A set of three annular bearings 186, 188 and 192 are provided in the recess 184 of the quill 14 for supporting the spindle carrier 16. The recess 184 terminates in a radial wall 194.

The spindle carrier 16 is a cylindrical body having a longitudinal axis which coincides with the eccentric rotation axis 182. The spindle carrier 16 is coupled with the servo motor 42 for angular positioning thereby through a coupling 196. The coupling 196 has a cupshaped portion having a set of internal axially extending ribs 198. The coupling is mounted on the rear end of the spindle carrier 16 by a set of screws 202 which extend through the ribs into the rear end of the spindle carrier. The coupling 196 is provided with a sleeve 204 which extends through the wall 194 of the quill 14. The servo motor 42 includes a rotor 206 and a stator 207. The stator is mounted inside the quill 14 and is carried thereby. The rotor 206 of the servo motor 42 is mounted on the sleeve 204 by a set of screws 208. An annular wear plate 212 on the coupling 196 seats against a thrust bearing 214 on the front side of the wall 194. Similarly, an annular wear plate 216 on the servo rotor 206 of the motor 42 seats against a thrust bearing 218 on the back side of the wall 194. The rotor 206 of the servo motor 42 is coaxial with the eccentric rotation axis 182 of the spindle carrier 16. The rotor 206 is provided with a coaxial hollow shaft 222. The shaft encoder 44 includes an optical code disk 224 carried on the shaft 222 by a mounting sleeve 226. The encoder also includes a code reader 228 which is fixedly mounted on the stator of the servo motor 42. The encoder 44 is adapted to develop an electrical signal corresponding to the angular position of the servo motor 42 and hence the spindle carrier 16 relative to the quill 14.

Figure 5:
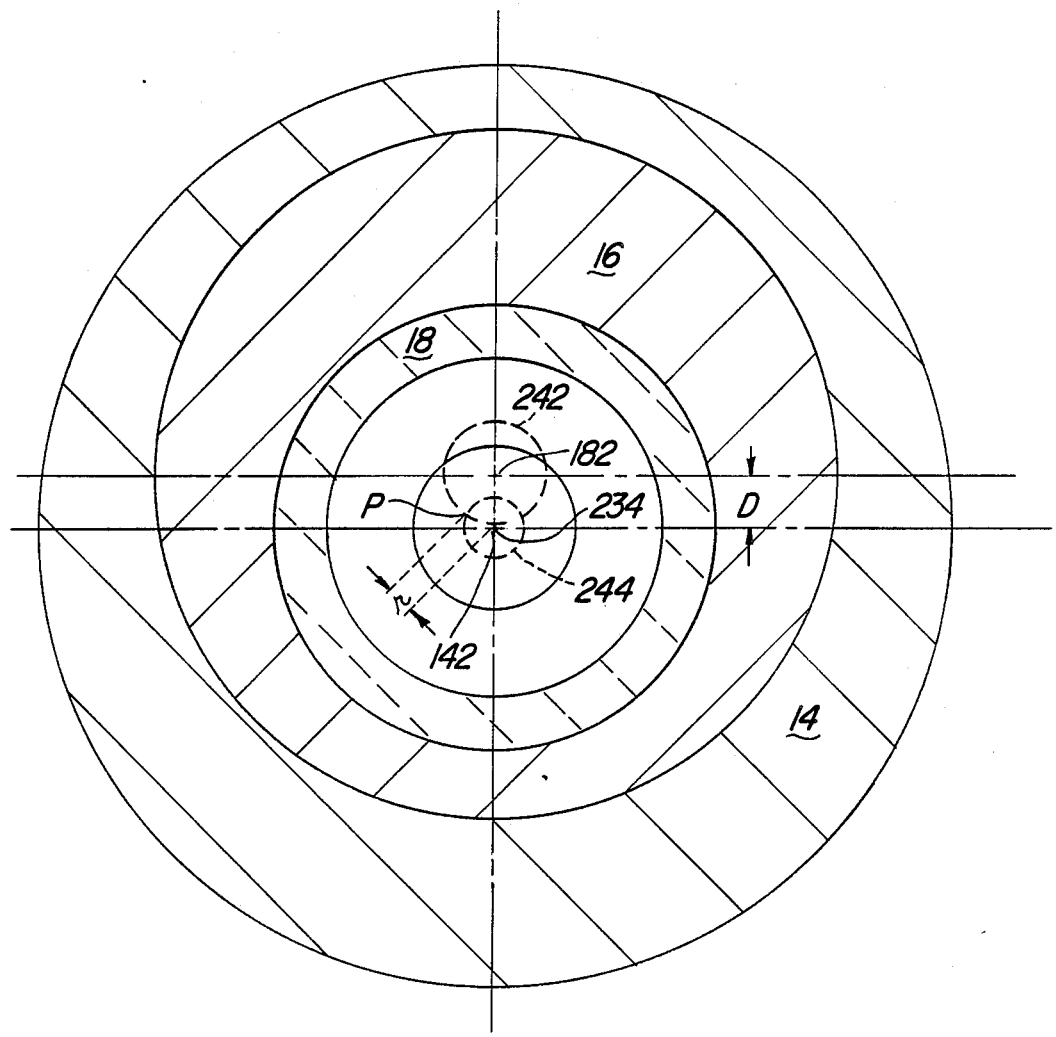
FIG. 5 is a view of the forward end of the spindle driver with a diagrammatic representation of the relationship of the rotation axes and the paths thereof for explanatory purposes.

The spindle motor 18 is fixedly mounted in the spindle carrier 16. The spindle motor 18 has a hollow motor shaft or spindle 232 which rotates around a spindle rotation axis 234. When the spindle carrier 16 is in its reference position, as shown in FIGS. 1 and 5, the spindle rotation axis 234 coincides with the quill rotation axis 142. The spindle 22 is provided with a tool socket or collet 236 at its forward end adapted to receive the shank of the tool 24. The motor 18 is preferably an electric motor adapted for high speed machining. It is noted that a central passageway is provided through the hollow shaft 222 of the servo motor 42 and through the coupling 196 and also through the spindle carrier 16 to provide for the necessary electrical wiring for the motor 18 and also to permit the use of a drawbar for a quick change tool socket, if desired. Additionally, fluid coolant may be supplied to the tool through the hollow spindle 22.

As discussed above, the spindle rotation axis 234 may be positioned coaxially with the quill rotation axis 142 or it may be positioned eccentrically with a variable degree of eccentricity. The adjustment of the eccentricity of the spindle rotation axis is accomplished by rotation of the spindle carrier 16 by means of the servo motor 42. FIG. 5 depicts the relationship of the quill rotation axis 142, the eccentric rotation axis 182 and the spindle rotation axis 234. In FIG. 5, the spindle carrier 16 is shown in its home or reference position relative to the quill 14. The eccentric rotation axis 182 of the spindle carrier 16 is offset by a distance D from the quill rotation axis 142. With the carrier 16 in its reference position, the eccentric rotation axis 182 coincides with the quill rotation axis 142. The dashed line circle 242 centered on the eccentric rotation axis 182 is the path of the spindle rotation axis 234 when the spindle carrier 16 is rotated through one complete revolution about its eccentric rotation axis 182. Thus, the spindle rotation axis 234 may be positioned relative to the quill rotation axis 142 at any position on the circle 242. When the spindle rotation axis 234 is positioned at point P, it has a degree of eccentricity r with respect to the quill rotation axis 142. With the spindle rotation axis at position P it describes a circular path 244 when the quill 14 is rotated about its axis. The path 244 of the spindle rotation axis is orbital with a radius r relative to the quill rotation axis 142.

With the spindle rotation axis 234 set for any desired degree of eccentricity, the variable pitch drive mechanism or differential lead screw including the front lead screw 26 and the rear lead screw 28 may be used to impart both rotary motion and axial motion to the quill 14. As shown in FIG. 6, the front lead screw 26 includes the front nut 64 and the associated right-hand thread 144 on the quill 14. Similarly, the rear lead screw 28 includes the rear nut 66 and the left-hand thread 146 on the quill 14. The differential lead screw is adapted to convert the two rotary motions of the front and rear nuts 64 and 66 into quill motion having two components, namely an axial component along the quill rotation axis and a rotational component about the quill rotation axis. In general, the differential lead screw is capable of moving the quill with any desired ratio of axial velocity and angular velocity. When the front and rear nuts 64 and 66 are rotated at the same velocity in opposite directions, the quill is moved axially without rotary motion. When the front and rear nuts 64 and 66 are rotated at the same velocity in the same direction, rotary motion is imparted to the quill but there is no axial motion thereof. The velocities and directions of the axial motion and rotary motion are given by the following equations:

$$W = \frac{W_A + W_B}{2} \quad (1)$$

where:
W = angular velocity of quill, rev./sec.
$W_A$ = angular velocity of nut 64, rev./sec.
$W_B$ = angular velocity of nut 66, rev./sec.

$$Z = \frac{W_A - W_B}{2} \times P \quad (2)$$

where:
Z = linear velocity of quill, pitch/second
P = pitch of threads 144 and 146

Figure 12:
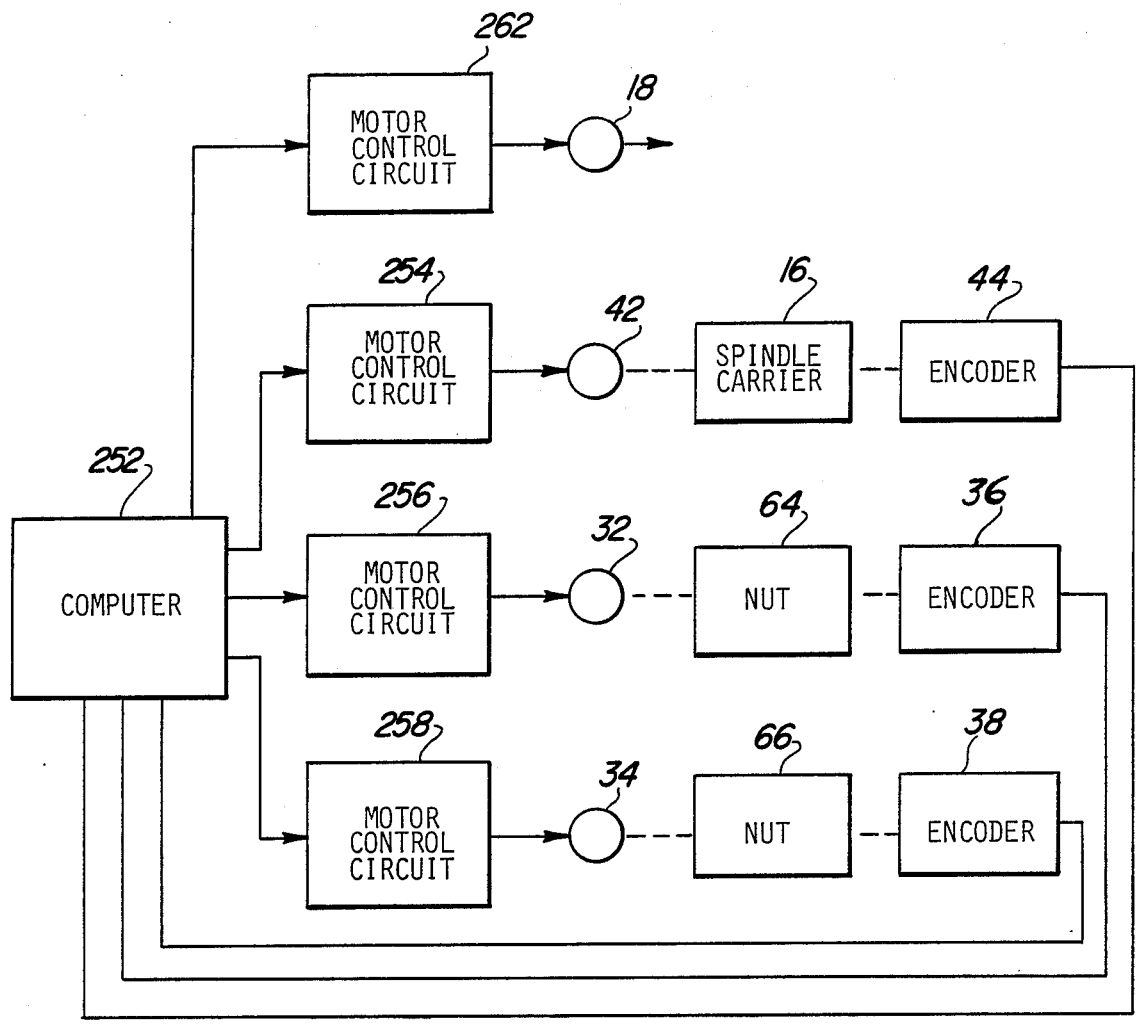
FIG. 12 is a block diagram of the control system for the spindle driver.

A control system for the spindle driver is shown in block diagram in FIG. 12. The control system includes a computer 252 which is loaded with a parts program for controlling the spindle driver for machining a particular part. The computer 252 may also be used for controlling the machine tool which carries the spindle driver for positioning it relative to the workpiece. The control system also includes the servo motor 42 which is coupled with the spindle carrier 16 and the encoder 44. A motor control circuit 254 for the servo motor 42 receives a command signal from the computer 252 and controls the energization of the servo motor in accordance with the command signal. The servo motor 42 controls the angular position of the spindle carrier 16 which determines the eccentricity or offset of the spindle rotation axis 234 from the quill rotation axis 142. The shaft encoder 44 supplies a feedback signal to the computer to close the loop of the control circuit for the servo motor 42. The control system also includes the servo motor 32 which is coupled with the front nut 64 of the front lead screw 26. A motor control circuit 256 receives a command signal from the computer 252 and controls the energization of the servo motor 32 in accordance with the command signal. The encoder 36 supplies a feedback signal to the computer. Similarly, the servo motor 34 is coupled with the rear nut 66 of the rear lead screw 28. A motor control circuit 258 receives a command signal from the computer 252 and controls the energization of the servo motor 34 accordingly. The encoder 38 supplies a feedback signal to the computer. The control system also includes a motor control circuit 262 for the spindle motor 18. The motor control circuit 262 receives a command signal from the computer which supplies a command signal for energization of the motor 18. Thus the spindle motor is programmed for speed and direction according to the parts program. The computer 252 may be programmed to cause the spindle rotation axis 234 to describe any desired path and to run the spindle motor at the desired speed and direction for machining a particular part. The servo motor 42 for the spindle carrier 16 may be energized to vary the eccentricity or offset of the rotation axis 234 from zero up to a predetermined maximum value. The offset may be constant or variable, as desired, during a machining operation. The servo motors 32 and 34 for the respective front and rear nuts 64 and 66 of the differential lead screw may be programmed to drive the quill at a desired pitch. The quill may be rotatively driven without axial displacement or it may be axially displaced without rotation. Thus, the spindle rotation axis 234 may be driven in a desired helical path with a desired orbital radius and a desired pitch either of which may be constant or variable during the machining operation.

The operation of the spindle driver will now be described with reference to an illustrative machining operation, namely drilling and threading a hole in a workpiece with a single tool. For this purpose, a special cutting tool is utilized; it is suitably of the type disclosed and claimed in copending application Ser. No. 06/840,443 filed Mar. 17, 1986 by Manual C. Turchan for "COMBINED HOLE MAKING AND THREADING TOOL". The tool 24 has a drill point 272 for drilling a hole and a thread mill 274 for thread milling. The drill point is adapted for right hand or clockwise rotation about the tool axis and the shank is supported in the collet 236 for rotation about the spindle rotation axis 234. The thread mill 274 is provided with a multiplicity of thread-form cutters in a conventional manner with a plurality of flutes. Each of the cutters is of annular configuration and the number of cutters is preferably equal to or greater than the number of threads to be cut. Each cutter segment has a cutting edge disposed on the leading end thereof for right-hand or clockwise rotation. The cutter segments of the thread mill have a maximum crest diameter which is equal to the maximum diameter of the drill point.

In operation, for the combined hole drilling and threading with the tool 24, the computer 252 is programmed for operating the spindle driver 10 so that the hole is drilled in the workpiece on inward feed of the tool and the threads are drilled upon retraction of the tool.

The drilling operation is depicted in FIG. 7. For drilling the hole, the spindle carrier 16 is set to its reference position by the servo motor 42; in this reference position, the spindle rotation axis 234 coincides with the quill rotation axis 142. The spindle motor 18 is controlled by the program of the computer 252 to be energized at the desired cutting speed in right-hand rotation. The feed of the tool 24 for hole drilling is provided by axial motion without rotation of the quill 14. This is provided by energizing the servo motors 32 and 34 under the control of the computer program for rotation in opposite directions at the same speed; the axial velocity or feed rate is determined by the speed of the motors. Inward feed of the tool for the drilling operation is produced by counterclockwise rotation of the front nut 64 (as viewed from the rear of the spindle driver 10) and clockwise rotation of the rear nut 66.

When the desired hole depth is achieved, the feed is stopped by stopping the rotation of both servo motors 32 and 34. Then the tool is backed off to provide a clearance before the thread milling is started. This is accomplished by energizing the servo motors 32 and 34 for rotation in opposite directions, with the front nut 64 being rotated in a clockwise direction to produce a retracting movement of the quill. The tool rotation by the spindle motor 18 is continued in the same direction and the thread milling portion of the cycle is commenced by imparting helical motion to the tool 24 in the retracting direction. The quill 14 is driven by the variable pitch drive mechanism with the desired ratio of axial velocity to angular velocity to establish the desired pitch of the threads to be milled. Although the spindle motor 18 is energized for continued rotation in the same direction as in the drilling operation, the speed may be adjusted to achieve the desired cutting speed in the milling operation. In order to impart orbital motion to the spindle rotation axis 234 and hence the cutting tool 24, the spindle carrier 16 is rotated about its eccentric rotation axis 182 away from its reference position so that the spindle rotation axis 234 is offset from the quill rotation axis 142. For example, the spindle carrier 16 may be rotated by the servo motor 42 under program control until the spindle rotation axis 234 is located at the point P shown in FIG. 5. This rotation of the spindle carrier 16 may be concurrent with the rotation of the quill 14 at a desired speed to ramp the tool 24 into the cut at a desired rate. With the spindle rotation axis 234 at the point P, orbital rotation is imparted to the tool 24 with an orbital radius r. This ramping of the tool into the cut is illustrated in FIGS. 8 and 9 which show the tool in the position where the spindle rotation axis is at point P. While the tool 24 is rotated about its own longitudinal axis by the spindle motor 18 and its axis is moved in the orbital path described by the circle 244 of FIG. 5 and FIG. 8, it is retracted axially to generate the helical motion to cut the desired threads. The tool 24 executes one orbital revolution during axial retraction corresponding to one thread pitch. Preferably, more than one orbital revolution is imparted to the tool, for example about one and one-half revolutions, to ensure clean cut threads. After the orbital motion is complete, the servo motor 32 is energized under program control to rotate the spindle carrier 16 to its reference position so that the spindle rotation axis 234 is coincident with the quill rotation axis 142. In this position, the axis of the tool is aligned with the hole axis and the tool may be withdrawn from the workpiece at high speed by energizing the servo motors 32 and 34 under program control in opposite directions at the same speed, with the front nut 64 being rotated in a clockwise direction.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A spindle driver for use in a machine tool comprising;
   a support member,
   a quill mounted on said support member for rotation about a quill rotation axis and for motion along said quill rotation axis,
   a spindle carrier comprising an eccentric member mounted for rotation in said quill about an eccentric rotation axis offset from said quill rotation axis,
   a spindle motor mounted on said eccentric member for rotation about a spindle rotation axis and adapted to support a tool for rotation therewith, said spindle rotation axis being offset from said eccentric rotation axis,
   servo motor means coupled with said eccentric member for producing relative translational movement between said spindle rotation axis and said quill rotation axis, and
   a variable pitch drive for simultaneously displacing said quill angularly about said quill rotation axis and axially along said quill rotation axis in a predetermined ratio of angular and axial velocity.

2. The invention as defined in claim 1 wherein said variable pitch drive is a differential lead screw drivingly coupled with said quill.

3. The invention as defined in claim 2 wherein:
   said differential lead screw comprises a pair of nuts and a threaded shaft, said pair of nuts being rotatably mounted and axially fixed relative to said support member, said threaded shaft threadedly engaging said pair of nuts and coupled with said quill.
   and separate reversible motors for rotating said pair of nuts independently of each other whereby said quill may be selectively displaced rotatively and axially in any desired ratio.

4. The invention as defined in claim 3 wherein each of said separate reversible motors comprises an electric motor having its stator fixed to said support member and its rotor mounted on a respective one of said pair of nuts.

5. The invention as defined in claim 1 wherein said spindle carrier comprises an eccentric member mounted on said quill for rotation about an eccentric rotation axis offset from said quill rotation axis.

6. The invention as defined in claim 5 wherein said quill has an eccentric bore therein and said eccentric member is a cylindrical body rotatably mounted in said eccentric bore.

7. The invention as defined in claim 6 wherein said spindle rotation axis and said quill rotation axis coincide when said eccentric member is rotated to a predetermined reference position.

8. The invention as defined in claim 6 wherein said eccentric member has an axially extending cavity therein and at least part of said spindle motor is disposed within said cavity.

9. A spindle driver for use in a machine tool comprising:
   a support member,
   a quill comprising a hollow shaft mounted on said support member for rotation about a quill rotation axis and for motion along said quill rotation axis,
   a spindle carrier comprising an eccentric member rotatably mounted within said quill for rotation about an eccentric rotation axis offset from said quill rotation axis,
   a spindle motor mounted on said eccentric member and a spindle coupled with said spindle motor for rotation about a spindle rotation axis and adapted to support a tool for rotation therewith, said spindle rotation axis being offset from said eccentric rotation axis,
   means for rotating said eccentric member about said eccentric rotation axis for producing relative translational movement between said spindle rotation axis and said quill rotation axis,
   and variable pitch drive means for simultaneously displacing said quill angularly about said quill rotation axis and axially along said quill rotation axis in a predetermined ratio of angular and axial displacement.

10. The invention as defined in claim 9 wherein said quill has an eccentric bore therein and said eccentric member is a cylindrical body rotatably mounted in said eccentric bore.

11. The invention as defined in claim 9 wherein said spindle rotation axis and said quill rotation axis coincide when said eccentric member is rotated to a predetermined reference position.

12. The invention as defined in claim 9 wherein said eccentric member has an axially extending cavity therein and at least part of said spindle motor is disposed within said cavity.

13. The invention as defined in claim 9 including a servo motor coupled with said eccentric member and mounted within said hollow shaft for angularly positioning said eccentric member.

14. The invention as defined in claim 9 wherein said support member is disposed circumferentially around said quill,
    and said variable pitch drive means is disposed between said support member and said quill.

15. The invention as defined in claim 14 wherein said variable pitch drive means is a differential lead screw drivingly coupled with said quill.

16. The invention as defined in claim 15 wherein:
    said differential lead screw comprises a pair of nuts and a threaded shaft, said pair of nuts being rotatably mounted and axially fixed relative to said support member, said threaded shaft threadedly engaging said pair of nuts and coupled with said quill,
    and separate reversible motors for rotating said pair of nuts independently of each other whereby said spindle may be selectively displaced rotatably and axially in any desired ratio.

17. The invention as defined in claim 16 wherein each of said separate reversible motors comprises an electric motor having its stator fixed to said support means and its rotor mounted on a respective one of said pair of nuts.

* * * * *

UNITED STATES PATENT AND TRADEMARK OFFICE
CERTIFICATE OF CORRECTION

PATENT NO. : 4,934,040

DATED : June 19, 1990

INVENTOR(S) : Manuel C. Turchan

Page 1 of 2

It is certified that error appears in the above-identified patent and that said Letters Patent is hereby corrected as shown below:

Column 1, line 40, delete "miller" and insert ---- Miller ----.

Column 3, line 16, delete "drive" and insert ---- driver ----.

Column 3, line 17, delete "for" and insert ---- of ----.

Column 5, line 57, after "nut" insert ---- 64 ----.

Column 6, line 32, delete "is".

Column 6, line 33, delete "left hand" and insert ---- left-hand ----.

Column 7, line 13, delete "servo".

Column 7, line 14, before "motor" insert ---- servo ----.

Column 9, line 41, delete "right hand" and insert ---- right-hand ----.

UNITED STATES PATENT AND TRADEMARK OFFICE
CERTIFICATE OF CORRECTION

PATENT NO. : 4,934,040
DATED : June 19, 1990
INVENTOR(S) : Manuel C. Turchan It is certified that error appears in the above-identified patent and that said Letters Patent is hereby corrected as shown below:

Column 11, line 33, after "quill" delete the period "." and insert --- , ---.

Signed and Sealed this

Ninth Day of June, 1992

*Attest:*

DOUGLAS B. COMER

*Attesting Officer*     *Acting Commissioner of Patents and Trademarks*